Patented Sept. 16, 1924.

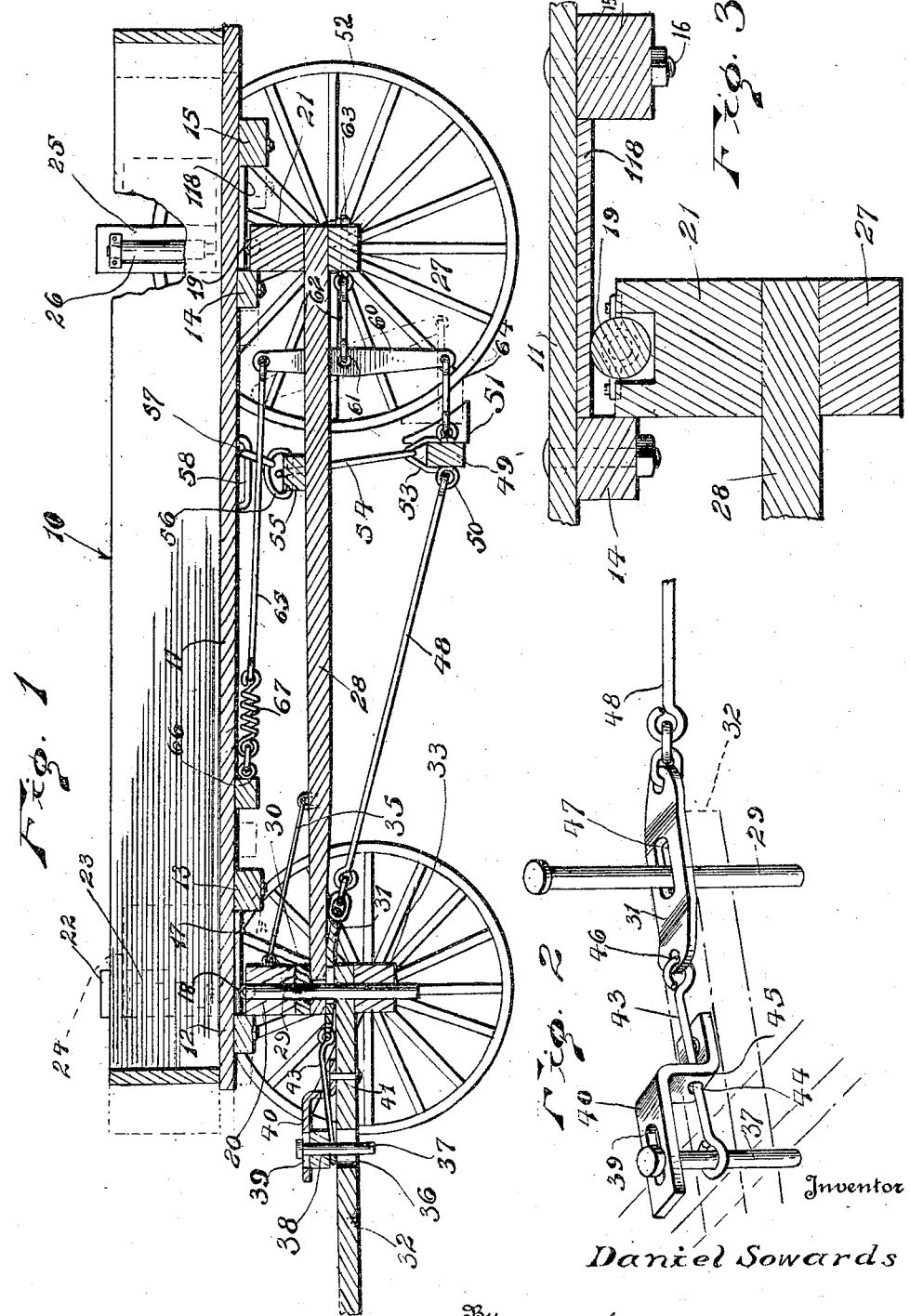

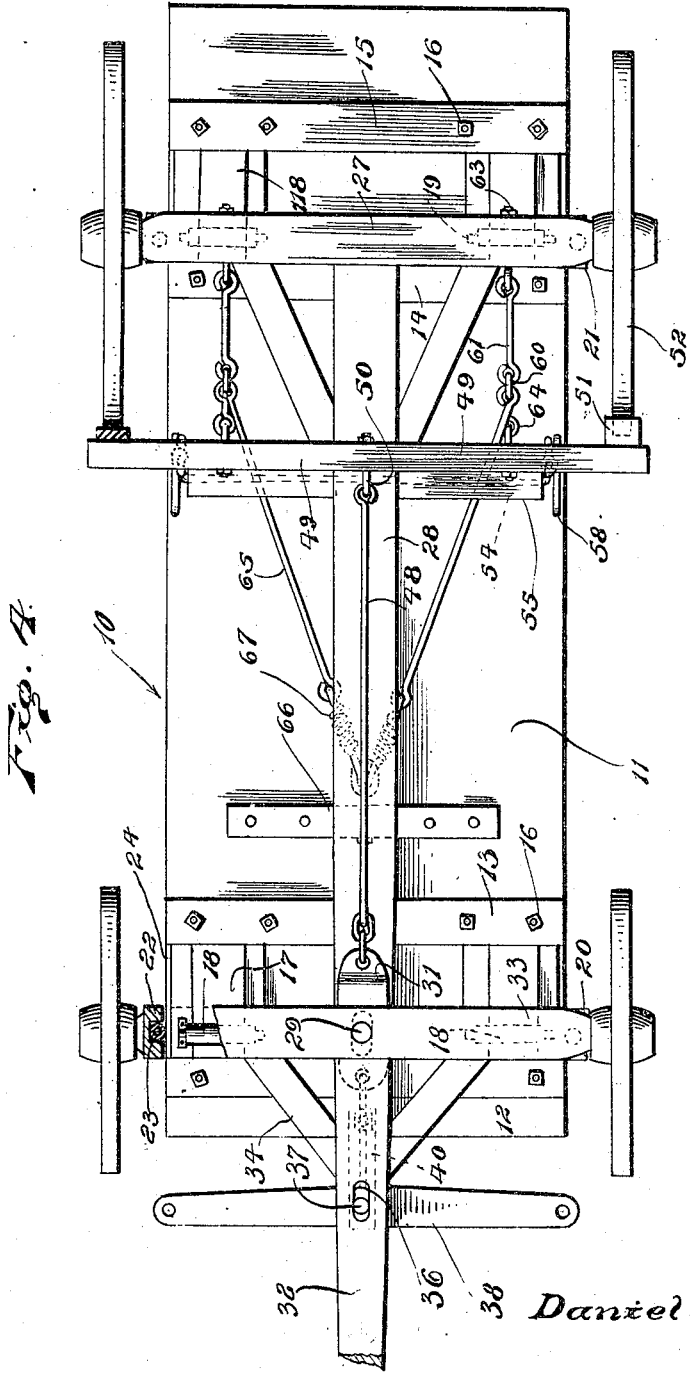

1,509,003

UNITED STATES PATENT OFFICE.

DANIEL SOWARDS, OF KETTLE FALLS, WASHINGTON.

AUTOMATIC WAGON BRAKE.

Application filed March 23, 1923. Serial No. 627,125.

*To all whom it may concern:*

Be it known that I, DANIEL SOWARDS, a citizen of the United States, residing at Kettle Falls, in the county of Stevens and State of Washington, have invented certain new and useful Improvements in Automatic Wagon Brakes, of which the following is a specification.

The present invention relates to brakes for heavy wagons and trucks or wheeled vehicles in general, and the main object of the invention is to provide a brake that works automatically on down grades or at sudden stops of the team without being operated by the driver, who accordingly can pay his full attention to the guiding of the team, as his hands are free for this work.

Another object of the invention is to arrange this brake in such a manner that it operates according to the load on the wagon, that is to say, with a light load, a comparatively light pressure is applied to the wheels, while with a heavy load, a greater pressure is applied.

Still another object of the invention is its automatic release, when there is no need for its application.

A further object of the invention is to cause the traces to be retracted when the brake is in action, so that there will be no danger of entanglement with the horses' feet, as is often the case with loose traces on ordinary wagons when going down hill. This will have as a consequence that the hames will not slide forward on the horses' necks when going down hill.

One advantage of the present invention is that it can be easily applied to any existing wagons.

In the accompanying drawings one embodiment of the invention is illustrated, and;

Figure 1 shows a longitudinal section of a farmer's wagon with the automatic brake in position;

Figure 2 is a perspective view of some of the details of the brake;

Figure 3 is a partial section along line 3—3 of Figure 1; and

Figure 4 is a bottom plan view of Figure 1.

The wagon illustrated is of the general box type but it is evident that the brake can be attached to any other kind of wagon or truck.

The box 10 extends the entire length of the wagon and its bottom 11 is provided with transverse reinforcing slats 12 and 13 over the front axle 33 and slats 14 and 15 over the rear axle 27 of the wagon. These reinforcing slats are rigidly secured by bolts 16 or in any other suitable manner to the bottom. A pair of friction or rubbing plates 17 are furnished between the front slats running in longitudinal direction near the sides of the box 10 and similar friction plates 118 are provided between the rear slats 14 and 15. These friction plates are intended to engage with corresponding rollers 18 and 19 deposited in suitable bearings on the upper side of the front and rear bolsters 20 and 21 respectively. The front bolster 20 has a pair of upright stakes 22, which also carry rollers 23 with their axes in vertical direction and adapted to engage with antifriction plates 24 carried on the sides of the box 10. The rear bolster has likewise stakes 25 with rollers 26 engaging friction plates in the sides of the box 10. In this manner it will be evident that the box 10 is free to run back and forth in the bolsters and contacting with the rollers to the extent of the distance between the front slats 12 and 13 and rear slats 14 and 15, which permit the same amount of movement of the box. The depth of the slats is sufficient to permit the contact thereof with the corresponding bolsters 20 and 21 at the front and rear limitation of the movement in order to retain the box in position in the bolsters.

Between the rear axle 27 and the rear bolster 21 is secured in the usual manner the reach 28 so as to form a firm connection therewith. This reach extends forwardly to engage the king pin 29 to freely turn thereon, this king pin running through the bolster 20, the spacer 30, the reach 28, the hammer strap 31, the pole or tongue 32, and the front axle 33. The pole 32 is secured in the usual manner between dogs 34 to the front axle 33 and the spacer 30 is also secured to the latter so as to permit turning motion between the bolster 20 and the spacer 30. Turning motion is also possible between the reach 28 on the one hand and the spacer 30 and the front axle 33 on the other hand. A central brace 35 connects the bolster 20 with the reach 28 permitting a slight movement between them.

The pole 32 has a longitudinal slot 36 adapted to receive a pintle 37 reaching up to the doubletree 38 and engaging in a longitudinal slot 39 furnished in the jaw 40, which is bolted to the pole 32 as at 41. The pintle 37 also engages with the connecting rod 43 running through an aperture 44 in the upright wall 45 of the jaw 40 and secured with its rear end to the forward end of the hammer strap 31 as at 46. This hammer strap 31 is also provided with an oblong opening 47 to permit a limited travel in longitudinal direction with regard to the king pin 29. Its rear end is linked to a brake releasing rod 48 which is linked at its rear end to a brake beam 49 as seen at 50. The ends of the brake beam 49 carry the usual brake blocks 51 situated in front of the rear wheels 52 and normally standing away from the latter. The brake beam 49 is suspended on links 53 hung on the ends of a U-shaped bar 54 loosely carried on a cross board 55, which is secured on top of the reach 28. In this manner the brake beam 49 is permitted to oscillate with the U-shaped bar 54, which has free movement in the staples 56 arranged over the same on the cross board 55. These staples 56 have linked connection 57 with other staples 58 on the under side of the box 10 and this connection is such that it will not interfere with the longitudinal movement of the box on the bolsters determined by the distance between the front slats 12 and 13 and rear slats 14 and 15 as already described.

A two-armed lever 60 is carried at each side of the wagon and centrally fulcrumed as at 61 on a link 62 secured by a bolt 63 in the rear axle 27. The lower end of each arm 60 is connected by a link 64 to one end of the brake beam 49, while the upper end of the two-armed lever 60 has similar connection 65 with the bottom 11 of the box 10 as at 66 and a coil spring 67 may be inserted in this connection in order to modify the brake pressure on the wheel.

When at rest, the parts take the position shown by full lines in Figures 1 and 4, and directly a pull is exerted on the doubletree 38 by the team, the pintle 37 will pull on the connecting rod 43, which pull is communicated through the hammer strap 31 and the releasing rod 48 so as to hold the brake blocks 51 still further away from the rear wheels 52. Supposing now that the team and wagon proceed down hill, then the team releases its pull on the doubletree 38 and the box 10 slides forward in the bolsters 20 and 21 whereupon the rear slats 13 and 15 advance towards their respective bolsters 20 and 21, while the box moves easily forward on the rollers 18, 19, 23 and 26. At the same time the box communicates its movement through the springs 67 and the tension rods 65 to the double armed lever 60, as indicated in dot and dash lines in Figure 1. The upper arm of the lever 60 then swings forward and the lower one rearward, turning on the fulcrum 61 causing the brake blocks 51 to swing with the brake beam 50 on the U-shaped bar 54, until they come in contact with the rear wheels 52. In this manner the forwardly acting component of the weight of the box 10 and its load is communicated to, and setting up friction against the rear wheels 52. It should here be noted that sufficient play is allowed between the cross slats 13 and 15 and their respective bolsters or, in other words, that before an abutment takes place between the bolsters and the slats, the brake blocks 51 have already come in contact with the wheels 52. It will readily be understood that the same action takes place when the team is stopped or slowed up suddenly, when the inertia of the box 10 will carry the same forward on the bolsters and apply the brakes.

Directly the team starts to pull on the doubletree 38, the brake blocks 51 will be drawn away from the rear wheels 52, while the same pull will act through the double armed lever 60 to draw the box rearwardly in the bolsters.

Having thus described the invention what is claimed as new is:

1. An automatic brake for wagons comprising brake blocks mounted on the wagon frame to permit lengthways displacement thereof, a box slidably mounted on the wagon frame in longitudinal direction thereof, and means connecting the box with the brake blocks and adapted to apply the same against the wheels upon a forward motion of the box upon the frame; said means including a vertical, two-armed lever, a link upon which the lever is centrally fulcrumed, said lever being mounted forward of the rear axle of the wagon, and attached thereto by said link, link connection between said brake blocks and one arm of the lever, yieldable connection between said box and the other arm of said lever, and brake releasing elements actuated by the doubletree of the wagon; said releasing elements including linked connection between the brake blocks and said tree, said tree having limited slidable movement on the pole in longitudinal direction thereof.

2. An automatic brake for wagons comprising a wagon frame having front and rear bolsters, roller bearings on said bolsters, a box supported by said roller bearings, two-armed levers mounted vertically to oscillate on the front side of the rear axle of the wagon, links between the rear axle and said levers forming fulcrums therefor, one arm of each lever having yieldable connection with said box, a brake beam carrying brake blocks and mounted to oscillate on said frame and having a link connection with the other arms on said two-armed levers, a tree carrying a pintle, said pintle being mounted to slide in longitudinal direction on said frame, and links positively connecting said pintle with said brake beams; whereby upon the pull on the tree being discontinued when the wagon is going downgrade, said box actuated by gravity, will slide forward and communicate its movement through said yieldable connection to said levers thus applying the brake blocks against the rear wheels.

In testimony whereof I affix my signature.

DANIEL SOWARDS. [L. S.]